United States Patent [19]

Williams

[11] 4,087,111
[45] May 2, 1978

[54] LOAD TRANSFER APPARATUS FOR USE BETWEEN A TRACTOR HITCHED TO A TRAILER

[75] Inventor: Willard R. Williams, Naturita, Colo.

[73] Assignee: Williams, Inc., Naturita, Colo.

[21] Appl. No.: 681,833

[22] Filed: Apr. 30, 1976

[51] Int. Cl.$^2$ ............................................. B60D 1/06
[52] U.S. Cl. .............................. 280/406 R; 172/445; 172/680
[58] Field of Search .......... 280/406 R, 405 A, 405 R, 280/405 B, 474; 172/439, 445, 450, 457, 662, 668, 677, 680

[56] References Cited

U.S. PATENT DOCUMENTS

| | | | |
|---|---|---|---|
| 2,347,898 | 5/1944 | Ferguson | 280/406 R |
| 2,930,630 | 12/1960 | Tanke | 280/406 R |
| 3,225,850 | 12/1965 | Simmons et al. | 280/406 R |

*Primary Examiner*—Joseph F. Peters, Jr.
*Assistant Examiner*—John A. Pekar
*Attorney, Agent, or Firm*—Max L. Wymore

[57] ABSTRACT

A transfer apparatus for use between a tractor-like vehicle and a trailer-like vehicle connected by a hitch connection means. The transfer apparatus comprises a linkage member attached between the tractor and trailer with at least a portion of the linkage member extending between the tractor and trailer at a position vertical with respect to the hitch connection means. Means in conjunction with the linkage member such as a hydraulic actuator may supply a rigid connection through the linkage member thereby preventing free hinging in a vertical plane between the tractor and trailer at the hitch connection means. The rigid connection may, for example, prevent rear-up of the tractor and shift weight to the rear driving wheels of the tractor.

3 Claims, 4 Drawing Figures

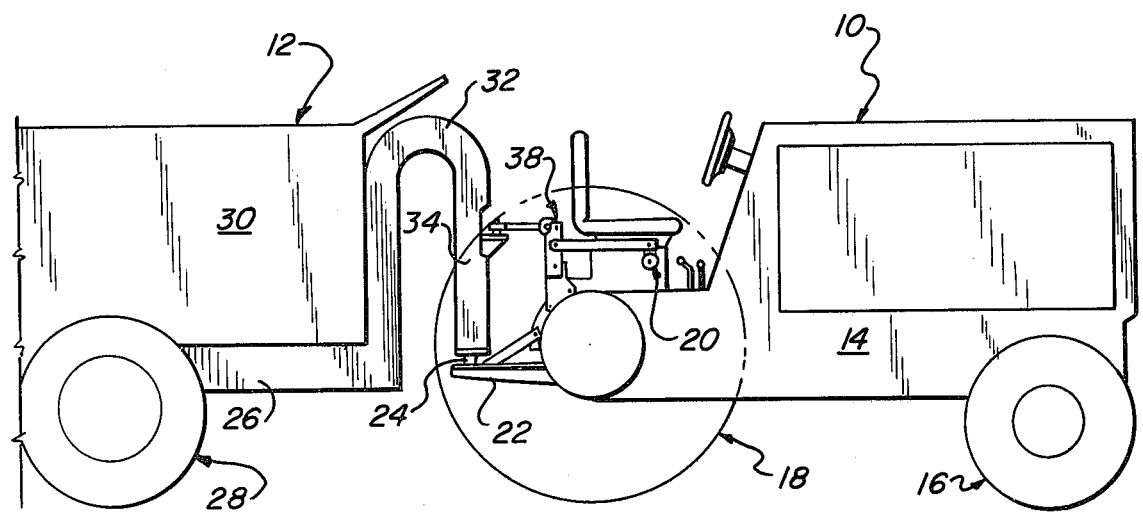
Fig_1
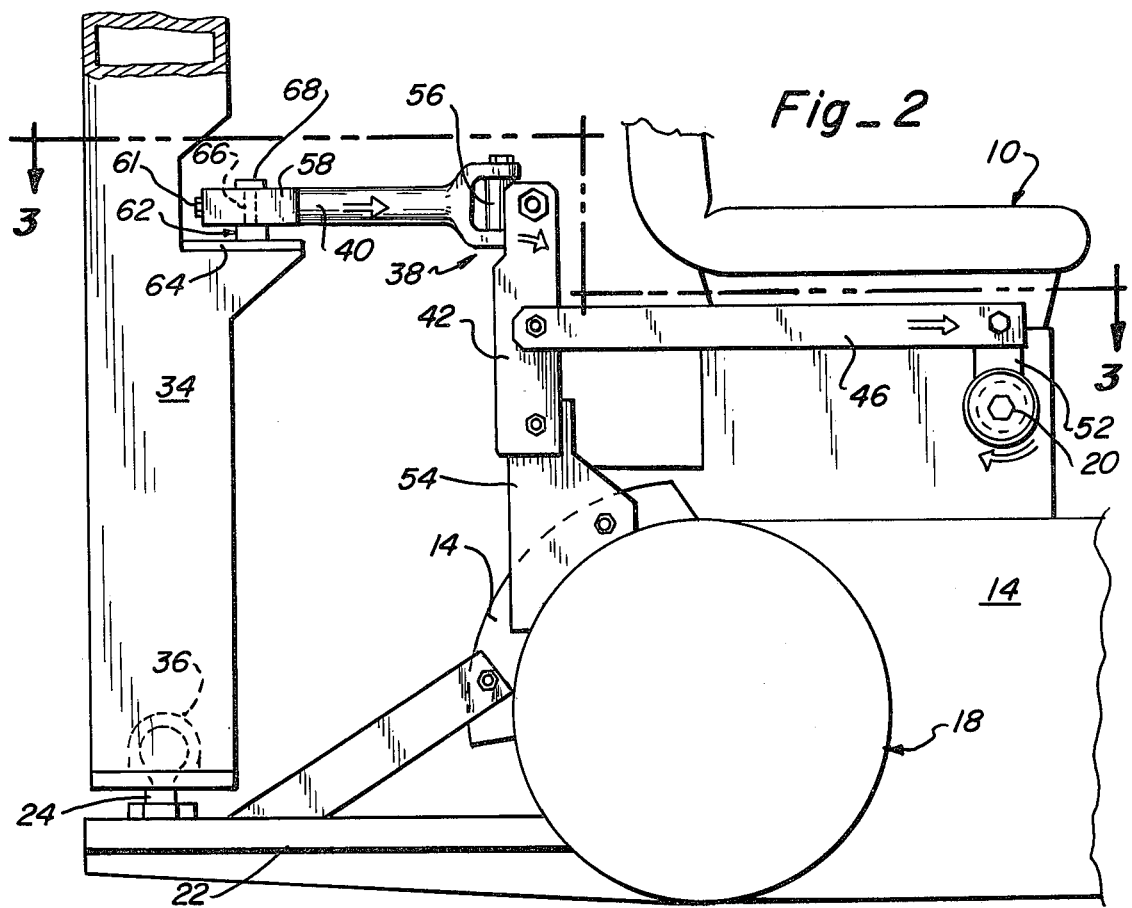
Fig_2

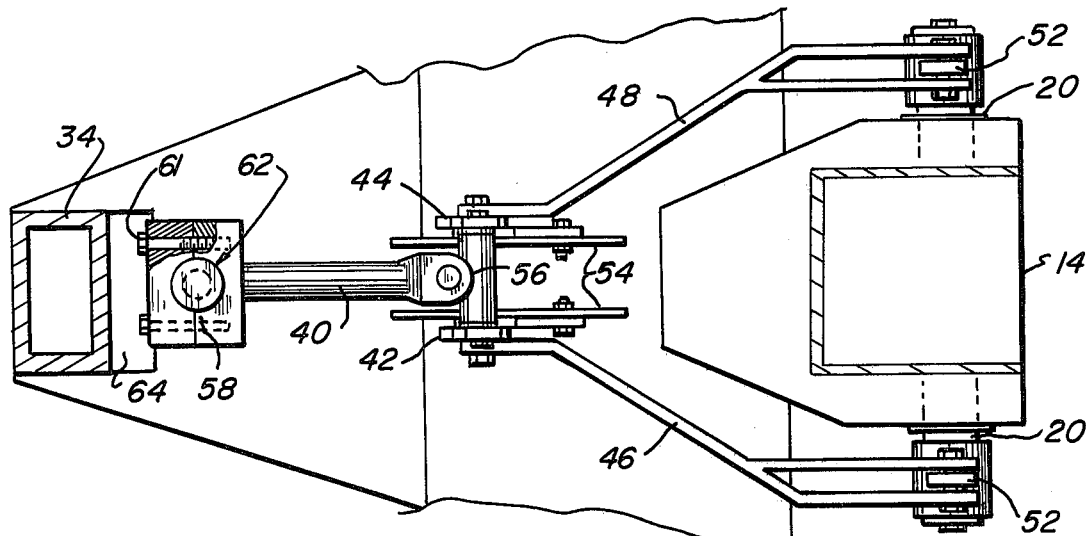
Fig_3
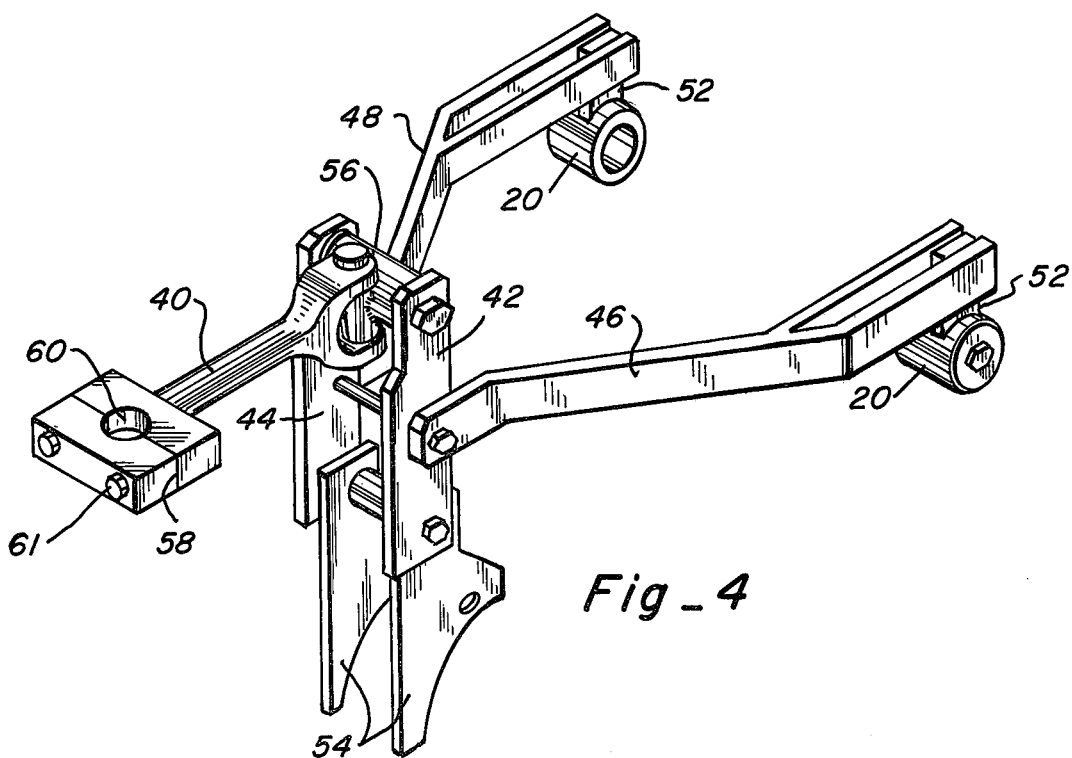
Fig_4

4,087,111

LOAD TRANSFER APPARATUS FOR USE BETWEEN A TRACTOR HITCHED TO A TRAILER

BACKGROUND AND SUMMARY OF THE INVENTION

This invention relates generally to wheeled vehicles and more particularly to a connection or linkage apparatus for use between a tractor-type vehicle and a trailer-type vehicle.

A problem often encountered in the use of certain tractor-type vehicles, such as agricultural wheeled tractors, is the tendency for the front wheels of the tractor to rear-up off of the running surface upon attempting to pull certain heavy loads. Rear-up becomes an increasingly serious problem when the tractor is attempting to move a load or a trailer up a significant incline from a stopped position as, for example, in attempting to haul ore in a trailer from a mine. When rear-up occurs the operator may be injured by being thrown off the tractor and by some of the equipment falling on the operator. If the tractor rears completely over or if the tractor is being operated in a mine shaft where the vertical roof clearance is small, the tractor and trailer may also be damaged.

Another frequently occurring problem with tractor-like and trailer-like vehicles is a loss of traction by the rear driving wheels of the tractor. This problem may be caused by wet or slippery surfaces such as those found in mine shafts. This problem, too, is aggravated when attempting to move the load up an incline.

Objectives of the present invention are to provide certain apparatus for overcoming these problems and to attain certain other advantages. The present invention avoids rear-up of a tractor-like vehicle pulling a trailer or load, increases the weight on the rear driving wheels of the tractor-like vehicle, increases traction, and provides safer operating conditions for the operator of the tractor. Attainment of these objectives makes the present invention well suited for use in mining operations where a conventional agricultural tractor is used to haul ore in a gooseneck-type of trailer.

The present invention which accomplishes these and other objectives may be summarized in conjunction with its use between a tractor-like vehicle and a trailer-like vehicle connected together by a hitch connection means. The invention comprises a linkage member, a means for attaching the linkage member between the tractor and trailer with at least a portion of the linkage member extending between the tractor and trailer at a position vertical with respect to the hitch connection means, and a means for supplying a rigid connection through the linkage member. In effect the rigid connection through the linkage member in conjunction with the normal connection through the hitch connection means causes a rigid link in a vertical plane between the tractor and the trailer, and thus, the invention may achieve the foregoing objectives and advantages as will be better understood from the following detailed description of a preferred embodiment of the invention and from the following brief description of the drawings.

BRIEF DESCRIPTION OF THE DRAWINGS

FIG. 1 is a side view of a tractor-like vehicle and a trailer-like vehicle also generally illustrating the use of one embodiment of the present invention between the two vehicles;

FIG. 2 is an enlarged side view of the embodiment of the invention as shown in FIG. 1 also including portions of the tractor and the trailer-like vehicles;

FIG. 3 is a top section view of the embodiment of the invention shown in FIG. 2 taken along section 3—3; and, FIG. 4 is a perspective view of the embodiment of the present invention as shown in the previous figures.

DETAILED DESCRIPTION OF A PREFERRED EMBODIMENT OF THE INVENTION

The present invention may be used between a tractor-like vehicle such as a conventional agricultural tractor 10 and a trailer-like vehicle such as the gooseneck trailer 12, as is illustrated in FIG. 1. The tractor 10 includes a main frame housing portion 14 to which are attached a front wheel and axle assembly 16 and a rear driving wheel and axle assembly 18. A hydraulically actuated internal draft control 20 also comprises a part of the tractor 10 as will be better understood from discussion in conjunction with other figures. Attached to the housing portion 14 is a draw member 22 to which is attached a ball member 24, best shown in FIG. 2. The draw and ball members comprise a portion of a hitch connection means for connecting the trailer 12 to the tractor 10 so that the trailer may be moved by the tractor.

The trailer 12 shown in FIG. 1 includes a main frame 26 to which is attached at least one wheel and axle assembly 28. A cargo portion 30 of the trailer is also provided for carrying loads. A gooseneck frame portion 32 is attached to the main frame 26 and extends generally from the cargo portion 30 forward in the shape of an inverted U. The gooseneck frame portion includes a member 34 by which the gooseneck frame portion extends to a socket portion 36 of the hitch connection means associated with the trailer, as best shown in FIG. 2. The member 34 extends generally at a position vertical with respect to the hitch connection means, and the socket portion 36 receives the ball member 24 to complete the hitch connection means between the tractor 10 and trailer 12.

The present invention is embodied in a transfer apparatus illustrated generally at 38 in FIG. 1 in use between the tractor 10 and trailer 12. The details of this embodiment will now be discussed in conjunction with FIGS. 2, 3 and 4. The transfer apparatus may comprise various linkage members 40, 42, 44, 46 and 48. One or more of the linkage members may extend between the tractor and trailer and be connected therebetween.

One or more of the linkage members such as members 46 and 48 may be attached to the internal draft control 20 of the tractor 10 by arms 52 which attach to shafts of the internal draft control. The shafts of the internal draft control are rotated by actuator means internal in the housing portion 14 of the tractor 10 for applying rotating force on the shafts. The actuator means of the internal draft control typically comprises a conventional hydraulic actuator device integral with the typical agricultural-type tractor, although the actuator means need not be an integral portion of the tractor in accordance with the broad aspects of the present invention. Supports 54 are rigidly attached to the housing portion 14 and one end of each of the linkage members 42 and 44 is pivotaly attached to the support 54. The other end of each of the linkage members 42 and 44 is attached by a connection member 56 to the linkage member 40. The connection member 56 has vertical and horizontal axes around which the linkage member 40 may pivot. Members 46 and 48 are pivotally connected between the arms 52 and the members 42 and 44.

The linkage member 40 includes a connection block 58 having a hole 60 therein for receiving a connection post 62 vertically attached to a ledge 64 protruding horizontally from the vertical member 34 of the trailer 12. The connection block 58 may be formed in the two pieces with the hole 60 formed partly in each of the two pieces, and the two pieces may be held together with bolts 61, as best seen in FIG. 4. The connection post 62 may have a reduced diameter portion 64 smaller than the hole 60, as best shown in FIG. 2. The hole in the connection block 58 may be placed over the reduced diameter portion 64 of connection post 62 by separating the two pieces of the connection block 58. When the two pieces of the connection block 58 are held tightly together with the bolts, an enlarged portion 68 of the connection post 62 prevents the connection block 58 from coming loose from the connection post 62, as is best shown in FIG. 2.

The foregoing description of the elements illustrates that at least one linkage member may be operatively connected between the internal draft control of the tractor and the trailer. The connection of at least one of the linkage members between the tractor and the trailer may be provided by a means for attaching the linkage member between the tractor and the trailer with at least a portion of the linkage member extending therebetween at a level vertically spaced with respect to the hitch connection means. Such attaching means may take a wide variety of different forms in accordance with the present invention, but in the present embodiment such an attaching means for the linkage member 40 may be the connection post 62 and the connection member 56. It is possible in accordance with other embodiments of the present invention that a linkage member could be attached directly to internal draft control by the attaching means. In the described embodiment, the linkage members 42 and 44 may also comprise a portion of the attaching means, and as a consequence, linkage member 40 extends between the tractor and trailer at levels generally vertically spaced with respect to hitch connection means. Specifically, member 40 is generally parallel to the draw member 22 of the hitch connection means as is best shown in FIG. 2.

The operation of the transfer apparatus will now be described primarily in conjunction with FIG. 2. When the invention is not to be put in use, for example, to prevent rear-up or to transfer weight, the actuator means is allowed to move freely. In the situation of the internal draft control 20 comprising the actuator means, the shaft to which the arms 52 are connected is allowed to rotate freely in either a clockwise or counterclockwise direction as shown in FIG. 2. The freely movable condition of the actuator means or internal draft control does not cause the application of force to the one or more of the linkage members, consequently, the tractor and trailer may pivot in a vertical plane at the hitch connection means in the same manner as if the present invention was not used between the tractor and trailer.

The tractor and trailer may also pivot in a horizontal plane because of the horizontal pivotable connection of the connection block 58 to the connection post 62 and because of the horizontal pivotable connection provided by the vertical axis of the connection member 56. Thus, turning the tractor relative to the trailer is facilitated since the transfer apparatus includes members which readily allow pivoting in a horizontal plane. The ability to turn the tractor relative to the trailer is also present when the transfer apparatus is in use because the horizontal pivotable connections are still freely movable.

When it is desired to place the transfer apparatus of the present invention in use, the operator actuates the actuator means which applies force on one or more of the linkage members. In the situation where the internal draft control 20 is employed as in FIG. 2, actuation by the operator causes the shaft and attached arms 52 to rotate clockwise. Members 46 and 48 move to the right and members 42 and 44 pivot clockwise about their pivotal connections to the support 54. The force to the right applied by members 42 and 44 is coupled to the linkage member 40 by the connection member 56, and force is applied to the connection post 62 of the vertical member 34. A sufficient force will pull the tractor and trailer together at a level vertically spaced above the hitch connection means since the vertical member 34 and the draw member 22 of the tractor will not yield. Thus, because of the rigid members leading to the ball member 24 and socket portion 36, the force applied to the linkage members causes the hitch connection means to pivot slightly in a vertical plane.

The tractor 10, under the force applied through the linkage member, tends to rotate counter clockwise around its rear axle of the rear axle and wheel assembly 18. The trailer 12 tends to rotate clockwise around its axle and wheel assembly 28 under the force applied throught the linkage member. Due to the horizontal pivotal connections at each of linkage member 40 the force may be applied even when the tractor is turned relative to the trailer.

Use of the transfer device may increase the weight on the rear driving wheels of the tractor, thereby increasing traction at those wheels. The force applied through the one or more of the linkage members transfers a portion of the weight supported by the front wheel and axle assembly 16 to the rear wheels since the tractor may pivot slightly counterclockwise at the rear wheels. With a sufficient force through the linkage members the front wheels may even be lifted off the running surface thereby placing all of the tractor weight on the rear wheels. Also, as the trailer rotates slightly clockwise under the application of force through the linkage members, the effective center of weight of in the cargo portion 30 is shifted slightly further forward increasing the weight on the rear driving wheels of the tractor. The increased weight on the rear driving wheels increases traction and allows the tractor to more easily move heavy loads up inclined surfaces or on slippery running surfaces.

The transfer device will also prevent rear-up of the tractor. With force applied to the linkage members the tractor is in effect rigidly connected in a vertical plane to the trailer at two different vertically spaced levels, thus preventing the hitch connection means from pivoting freely in a vertical plane. Thus, as the tractor attempts to rear-up, force caused by the rearing is transmitted through the linkage member 40 to the vertical member 34 and the tractor is prevented from rotating counterclockwise or rearing up. The prevention of rear-up increases the safety to the operator since the person operating the tractor will not be thrown off the tractor, be run over by the trailer, be caught in the hitch connection means, or be caught under the falling tractor. The present invention also avoids damage that might occur to the tractor and trailer during rear-up. In mine shafts the front wheels of the tractor may not rise very high before part of the tractor strikes the roof of the mine shaft, but the use of the present invention between the tractor and trailer in hauling ore from mine shafts prevents the likelihood of rear-up.

It should be understood that the operator may manually control the amount of force applied to the linkage member by manual controls. It is also possible that certain automatic controls may be employed to apply forces according to a predetermined control scheme, if desired. It should also be understood that when force is applied to the linkage member, such as by the internal draft control or by other actuator means, the linkage members may be held in a rigid position thereby securing a means for operatively supplying a rigid connection through the linkage member.

A presently preferred embodiment has been shown and described in detail, but it may be that those skilled in the art will foresee changes and modifications in the described embodiment. Therefore, it is intended that the claims cover all such changes and modifications as fall within the true spirit and scope of the invention.

What is claimed is:

1. Load transfer apparatus for use with a tractor and a trailer comprising:
    a trailer having a gooseneck frame with an upper curved portion and terminating at a free end in a vertical portion;
    hitch connection means positioned at the free end of the gooseneck frame;
    a tractor having a drawbar;
    hitch means mounted on the tractor drawbar connected with the hitch connection means of the trailer;
    a linkage member connected at one extremity to the tractor and at the other extremity to the vertical portion of the trailer frame above and in vertically spaced relation to the drawbar hitch connection; and,
    means operatively connecting said one extremity of the linkage member to the tractor for effectively foreshortening the distance between points of connection of said linkage to said tractor and said trailer to effect a pulling force on the trailer and tractor.

2. The apparatus of claim 1 wherein the linkage member interconnecting the tractor and the trailer is positioned substantially parallel to the drawbar hitch connection.

3. The apparatus of claim 1 wherein said means for connecting said linkage to the tractor includes a draft control on the tractor including a lever having a free end and means to rotate the lever in a vertical plane wherein the linkage member is connected to an upper end of a vertically positioned member, a lower end of which is pivotally connected to the tractor, and a link is pivotally connected at one end to the vertically positioned member, intermediate the linkage member and tractor connection, with the link being connected at another end to the free end of the draft control lever.

* * * * *